United States Patent
Smith et al.

(10) Patent No.: US 9,793,969 B2
(45) Date of Patent: Oct. 17, 2017

(54) ARRAY-TO-ARRAY BEAMFORMING AND ITERATIVE TIME REVERSAL TECHNIQUES

(71) Applicant: Ziva Corporation, San Diego, CA (US)

(72) Inventors: David Smith, Ellicott City, MD (US); Mark Hsu, La Jolla, CA (US); Maha Achour, Encinitas, CA (US); Jeremy Rode, San Diego, CA (US); Anis Husain, San Diego, CA (US); Kris Gregorian, Encinitas, CA (US); Jeremy Ward, Solana Beach, CA (US)

(73) Assignee: ZIVA CORP., San Diego, CA (US)

( * ) Notice: Subject to any disclaimer, the term of this patent is extended or adjusted under 35 U.S.C. 154(b) by 0 days.

(21) Appl. No.: 15/277,934

(22) Filed: Sep. 27, 2016

(65) Prior Publication Data
US 2017/0093475 A1    Mar. 30, 2017

Related U.S. Application Data

(60) Provisional application No. 62/234,557, filed on Sep. 29, 2015.

(51) Int. Cl.
*H04B 7/02*    (2017.01)
*H04B 7/06*    (2006.01)
*H04B 7/024*    (2017.01)

(52) U.S. Cl.
CPC .......... *H04B 7/0617* (2013.01); *H04B 7/024* (2013.01)

(58) Field of Classification Search
CPC .......... H04B 7/024; H04B 7/026; H04B 7/04
See application file for complete search history.

(56) References Cited

U.S. PATENT DOCUMENTS

| 2001/0033248 | A1* | 10/2001 | Owechko | H01Q 1/246 342/371 |
| 2008/0003948 | A1* | 1/2008 | Mitran | H04B 7/024 455/67.11 |
| 2015/0208431 | A1* | 7/2015 | Chen | H04W 4/08 370/329 |

OTHER PUBLICATIONS

Collaborative Beamfocusing Radios (COBRA): A reciprocity based distributed beamforming system, Rode, Gregorian, Ward, Husain, Jan. 24-27, 2016 (all pages).

(Continued)

*Primary Examiner* — David S Huang
(74) *Attorney, Agent, or Firm* — Anatoly S. Weiser, Esq.; Techlaw LLP

(57) ABSTRACT

In examples, two arrays of Radio Frequency nodes achieve enhanced beamforming for communications between the arrays by successively sending sounding signals from one array to the other array. Each sounding signal sent by the first of the two arrays is beamformed through time reversal of an immediately preceding sounding signal received by the first array from the second array, and each sounding signal (except the initial sounding signal) sent by the second array is beamformed through time reversal of an immediately preceding sounding signal received by the second array from the first array. The initial sounding signal sent by the second array may be omnidirectional, beamformed through a guesstimate, random, predetermined, or determined through a search of the area where the arrays are located. With sufficient beamfocusing, the arrays may communicate by sending and receiving data from one array to the other array.

23 Claims, 12 Drawing Sheets

(56) References Cited

OTHER PUBLICATIONS

Collaborative Beamfocusing Radio (COBRA), Rode, Hsu, Smith, Husain, May 28, 2013.
IEEE XPlore, Mar. 31, 2016, citation of Collaborative Beamfocusing Radios (COBRA): A reciprocity based distributed beamforming system, Rode et al., (acc. Nov. 17, 2016, all pages).
SPIE citation of Collaborative Beamfocusing Radio (COBRA), Rode, Hsu, Smith, Husain, May 28, 2013 (accessed Nov. 17, 2016, all pages).

* cited by examiner

ARRAY-TO-ARRAY BEAMFORMING AND ITERATIVE TIME REVERSAL TECHNIQUES

CROSS-REFERENCE TO RELATED APPLICATIONS

The present application claims priority from U.S. Provisional Patent Application Ser. No. 62/234,557, entitled ARRAY-TO-ARRAY BEAMFORMING USING ITERATIVE TIME REVERSAL TECHNIQUES, filed on 29 Sep. 2015, which is hereby incorporated by reference in its entirety as if fully set forth herein, including text, figures, claims, tables, and computer program listing appendix (if present).

FIELD OF THE INVENTION

This document relates generally to the field of wireless communications. Selected examples relate to distributed/cooperative communication arrays of nodes and/or antennas using Time-Reversal (TR) techniques for communications between different arrays of antennas/nodes where the receiver array and transmitter array are located in different locations.

BACKGROUND

Distributed coherent communications are Radio Frequency (RF) communications where coherent transmissions are made from a transmit antenna array, and/or RF transmissions are received by a synchronized receive antenna array. Each of the antenna arrays may be formed by an array of nodes, with each of the nodes having one or more of the antennas. Some or all of the nodes of either transmit (Tx) node array or receive (Rx) node array may be ad hoc nodes (as is described below). The "coherent" property of the coherent communications refers to synchronization of the nodes, so that (1) each of the nodes in the transmit array can transmit synchronously, and/or (2) each of the nodes of the receive array are synchronized and the received signals may be combined using a common time reference, with resulting transmit and/or receive array gain. Distributed coherent communications may offer significant link budget gains and increased performance over those available with single-antenna-to-single-antenna communications. Compared to the use of single antenna transceivers, the use of multiple antennas in wireless networks offers the promise of increased data rates, reach distance, battery life, anti-jam capabilities, spectral reuse, as well as reduced latency. Distributed coherence can be leveraged into transmit beamforming (with, e.g., $N^2$-fold increase in power for N transmit antennas), receive beamforming (with, e.g., M-fold increase in power for M receive antennas), and simultaneous transmit/receive beamforming gains (with a theoretically-possible $N^2M$-fold increase in power for N transmit to M receive antennas).

Distributed communication and networking approaches, however, may suffer from one or more of a number of disadvantages, including these:

1. Some systems may improve established point-to-point links, but cannot create links which would otherwise have not existed;
2. Some systems rely on complex weights and pre-coding matrices calculations derived from link measurements, which may not always be available or easily obtainable;
3. Some systems employ long latency feedback techniques, which may inject extra delays and may not converge in time sufficiently short for operation in fast-changing dynamic and otherwise challenging environments;
4. Some systems rely on channel training in the forward and return directions to estimate weights and pre-coding matrices (i.e., "closed loop" or "explicit" approach), with associated complexity and delays;
5. Some systems require brute force, system-wide, long-term and short-term synchronization of carrier frequency, modulation, data, and time.

At a given array, collaborative beamforming weights may be discovered using a "sounding" signal, an opportunistic or an intentional signal emitted by the object of the beamforming, as discussed in more detail below. The underlying assumption of such collaborative beamforming communications is that a single target node is capable of emitting a sounding signal with sufficient power to overcome link losses to reach the beamforming array, which can then retrodirect the signal back to the target node as a many-to-one (N:1) beamformer. In cases of one-to-many (1:M) receive beamforming where a single node emits a signal and an array of nodes on the receiving side uses beamforming weights to receive the signal, the underlying assumption is that the emitting node transmits with sufficient power for the signal to traverse the channel and be detected by the array of nodes on the receiving side.

It is not always the case, however, that a single transmitting node can transmit with power sufficient to be detected on the other side of the link; in other words, a single node may not be able to "close" the link on its own, particularly where the transmitted signal is a sounding signal and initially is not beamformed. For a many-to-many (N:M) array-to-array beamforming, where a pair of arrays communicate with one another, simultaneous transmit and receive gains can be used to enhance the link budget. Link budget gains may be applied, for example, to link improvement or reduction in transmit power. Table 1 below is a summary of possible benefits from simultaneous transmit and receive beamforming gains in exemplary systems:

TABLE 1

|  | Data Rate | Reach | Anti-jam | Latency | LPI/LPD/ Spectral Reuse | Battery (PA) Life |
|---|---|---|---|---|---|---|
| Link Improvement (Full TX Power) | ↑$Log_2(N^2 \cdot M)$ | ↑$N \cdot \sqrt{M}$ | ↑$N^2 \cdot M$ | ↓Hops | ↓N | — |
| Stealth (1/$N^2$ TX Power) | ↑$Log_2(M)$ | ↑$\sqrt{M}$ | ↑M | — | ↑N | ↑$N^2$ |

Such gains may be achieved when transmit and receive beamforming weights are derived using optimal algorithms and applied at the Tx and Rx arrays. The correct channel information between the array members on each side of the link and a mechanism for the nodes to transmit/receive a corrected and weighted signal at each of the array nodes are needed, so that beamforming is achieved to within an accuracy required by the system. If the array nodes are distributed (i.e., untethered physically separated radios such as ad hoc nodes described below), each array may implement a distributed algorithm across the nodes of the array, enabling the array to operate in a coherent manner, providing frequency, and phase/time synchronization/alignment of the clocks and oscillators of the different nodes of the array. Certain array synchronization/alignment methods for local synchronization of a distributed set of array nodes are described in some of the related and commonly-owned patent documents listed below.

The problem of initially detecting a signal such as a sounding signal without a priori knowledge of the target, the environment, and the beamforming weights, however, remains.

There is a need for techniques for improving radio frequency communications, and in particular for techniques to improve beamforming in circumstances where sounding transmissions from a single node of a target array may not be detectable by the transmitting array. There is also a need for techniques for establishing and maintaining RF communications between arrays with improved beamforming weights, in both static and dynamically-changing environments, and in both Line-of-Sight (LoS) and Non-Line-of-Sight situations (NLoS).

SUMMARY

Embodiments, variants, and examples described in this document are directed to methods, apparatus, and articles of manufacture that may satisfy one or more of the above described and/or other needs.

Selected examples of communication architecture described in this document enable improved communications by allowing a first array of RF transmit-receive (TX/RX) nodes to communicate cooperatively with a second array of RF TX/RX nodes. In each of the arrays, the TX/RX nodes may be tethered with a common clock reference, operating as a coherent array; the nodes of a particular "array" may be simply different (spatially diverse) antennas of the same transceiver system. In each of the arrays, some or all of the nodes may alternatively be untethered, ad hoc (as this term is defined below) nodes with independent clock references which use certain processes to achieve phase, frequency, and time synchronization/alignment of the clocks of the individual nodes of the array, enabling the nodes of a particular array to operate as a coherent array and effect distributed coherent communications. As has already been mentioned, various synchronization/alignment processes are described in the related and commonly-owned patent documents listed below.

Selected examples described in this document perform iterative time reversal processes between two arrays of nodes, with each array transmitting its sounding signals and refining its beamforming weights and its following sounding signals iteratively, as the array receives the sounding signals from the other array. In examples, the largest node-to-node distance of either or both of the arrays may be substantially smaller (by a factor of ten) than the smallest distance between any of the nodes of one of the arrays and any of the nodes of the other array. In examples, the largest node-to-node distance of either or both of the arrays may be comparable to (not substantially smaller than) the smallest distance between any of the nodes of one of the arrays and any of the nodes of the other array, resulting in a bistatic configuration.

In an embodiment, a method of radio frequency (RF) communication between arrays of nodes includes aligning/synchronizing a plurality of ad hoc nodes of a first array in time and frequency; aligning/synchronizing a plurality of ad hoc nodes of a second array in time and frequency; transmitting a first initial sounding signal from the plurality of ad hoc nodes of the first array to the plurality of ad hoc nodes of the second array; and successively sending sounding signals from the plurality of ad hoc nodes of the first array to the plurality of ad hoc nodes of the second array and from the plurality of ad hoc nodes of the second array to the plurality of ad hoc nodes of the first array, wherein each sounding signal sent by the plurality of ad hoc nodes of the second array is beamformed through time reversal of an immediately preceding sounding signal received by the plurality of ad hoc nodes of the second array from the plurality of ad hoc nodes of the first array, and each sounding signal except the first initial sounding signal sent by the plurality of ad hoc nodes of the first array is beamformed through time reversal of an immediately preceding sounding signal received by the plurality of ad hoc nodes of the first array from the plurality of ad hoc nodes of the second array.

In an embodiment, an apparatus includes a first array comprising a plurality of first ad hoc radio frequency (RF) nodes, and a second array comprising a plurality of second ad hoc RF nodes. In the apparatus, the first array and the second array are configured to: align/synchronize the plurality of first ad hoc RF nodes in time and frequency; align/synchronize the plurality of second ad hoc RF nodes in time and frequency; transmit an initial sounding signal from the plurality of first ad hoc RF nodes of the first array to the plurality of second ad hoc radio frequency (RF) nodes of the second array; and successively send sounding signals from the plurality of first ad hoc RF nodes of the first array to the plurality of second ad hoc RF nodes of the second array and from the plurality of second ad hoc RF nodes of the second array to the plurality of first ad hoc RF nodes of the first array, wherein each sounding signal sent by the second array is beamformed through time reversal of an immediately preceding sounding signal received by the second array from the first array, and each sounding signal except the initial sounding signal sent by the first array is beamformed through time reversal of an immediately preceding sounding signal received by the first array from the second array.

In an embodiment, an article of manufacture includes at least one non-volatile machine-readable storage medium with program code stored in the at least one non-volatile machine-readable storage medium. The program code may be executed by processors of nodes of a first array and of nodes of a second array, each node of the first array and each node of the second array comprising an antenna, a radio frequency transceiver coupled to the antenna, a local oscillator, and a processor coupled to the radio frequency transceiver to control operation of the transceiver. When the code is thus executed, it configures the nodes of the first array and the nodes of the second array to align/synchronize the nodes of the first array in time and frequency; align/synchronize the nodes of the second array in time and frequency; transmit a initial sounding signal from the first array to the second array; and successively send sounding signals from the first array to the second array and from the second array to the first array, wherein each sounding signal sent by the second array is beamformed through time reversal of an immediately preceding sounding signal received by the second array from the first array, and each sounding signal except the initial sounding signal sent by the first array is beamformed through time reversal of an immediately preceding sounding signal received by the first array from the second array.

In an embodiment, a method of radio frequency (RF) communication between arrays of nodes includes aligning/synchronizing a plurality of ad hoc nodes of a first array in time and frequency; aligning/synchronizing a plurality of ad hoc nodes of a second array in time and frequency; step for Reciprocal Convergence process between the first array and the second array to enable beamformed transmissions from the first array to the second array and from the second array to the first array; and sending RF data communications from the first array to the second array and/or from the second array to the first array, the step of sending being performed after the step for Reciprocal Convergence process.

In an embodiment, a method of radio frequency (RF) communication includes aligning/synchronizing a plurality of ad hoc nodes of a first array in time and frequency; transmitting an initial sounding signal from the first array to a second array of nodes; successively sending sounding signals from the first array to the second array, wherein each sounding signal except the initial sounding signal is beamformed through time reversal of an immediately preceding sounding signal received by the first array from the second array; determining whether sufficient focusing between the first array and the second array has been achieved, thereby obtaining a determination; terminating the step of successively sending in response to the determination indicating that sufficient focusing has been achieved; and sending RF data communications from the first array to the second array in response to the determination indicating sufficient focusing.

These and other features and aspects of selected embodiments not inconsistent with the present invention(s) will be better understood with reference to the following description, drawings, and appended claims.

DETAILED DESCRIPTION

Figure 1:
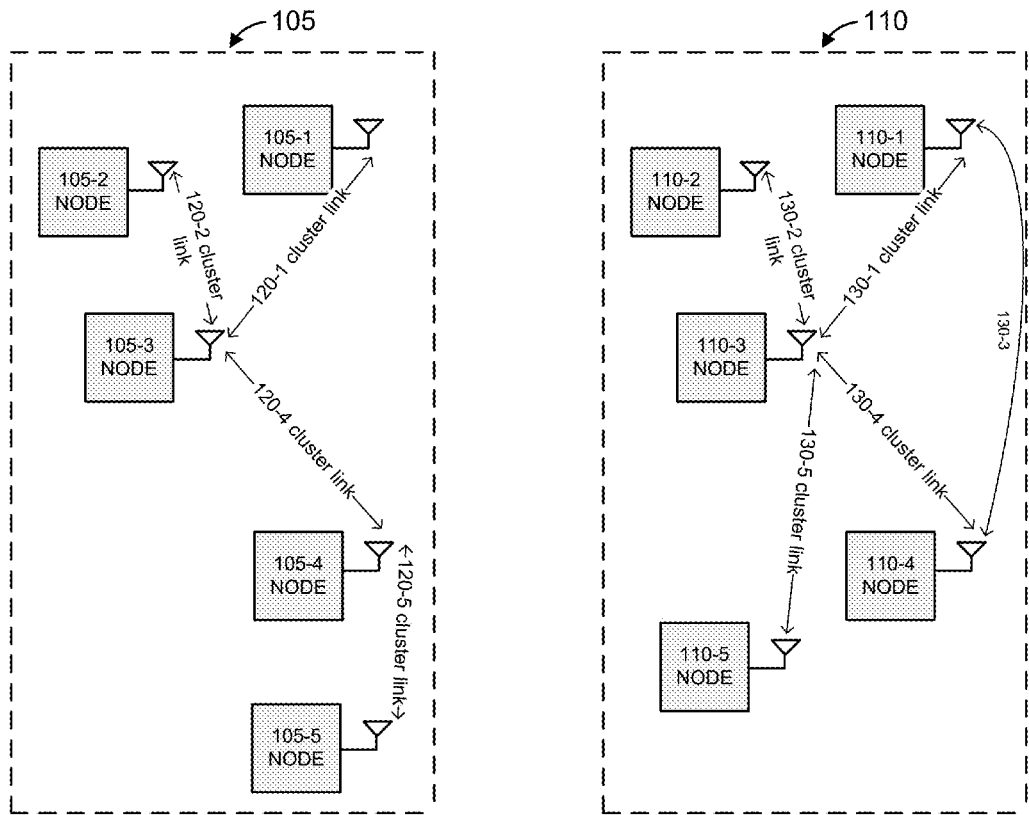
FIG. 1 illustrates selected nodes and links of two arrays configured in accordance with one or more features described in this document.

The words "embodiment," "variant," "example," and similar words and expressions as used here refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words with their inflectional morphemes, as well as similar words and phrases, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and process flow may be altered based on whether the condition is met or not met.

The expression ad hoc in reference to nodes of an array of nodes is used to signify that at least some (or all) of the ad hoc nodes have their own physical clocks, and the nodes are "untethered" in the sense that they may be (1) free to move, in absolute terms (e.g., with respect to a point with fixed coordinates, including scatterers and nodes of the other array), and to move with respect to each other; and (2) free to rotate around one or more axes. Some constraints on the movements of some or all of the nodes need not necessarily vitiate their untethered or ad hoc character; for example, nodes that are free to move in only one or two dimensions (and not all three dimensions) may still be ad hoc nodes, whether or not they rotate around any axis. Examples of such nodes may include radios carried by a squad of soldiers; radios onboard different aircrafts, water vessels or buoys, land vehicles, satellites; and similar nodes. The nodes may be ad hoc even if they are not used in TR-communications; for example, nodes of a phased-array that is beamforming in a selected direction (rather than beamforming on a selected spot/item or spot-focusing, as is typically the case with TR communications) may also be ad hoc nodes.

Some definitions have been explicitly provided above. Other and further explicit and implicit definitions and clarifications of definitions may be found throughout this document.

FIG. 1 illustrates in a high level, block-diagram manner, selected components of arrays 105 and 110. We illustrate and describe the array 105 in some detail, with the understanding that the array 110 may be identical to the array 105, substantially the same as the array 105, or similar to the array 105. The array 105 includes ad hoc nodes 105-N that may communicate with each other, and synchronize their respective clocks (i.e., aligning time, phase, and frequency). As shown, the array 105 includes five distributed cooperating nodes, 105-1 through 105-5. In similar examples, the array 105 may include any number of a plurality of nodes 105-N, for example, 2, 3, 4, 5, 6, 7, 8, 9, 10, or more.

The nodes 105-N may be within LoS or NLoS of each other, and may communicate directly with each other via side channel links 120. As shown, the links 120-1, 120-2, and 120-4 connect the node 105-3 to each of the nodes 105-1, 105-2, and 105-4, respectively; and the link 120-5 connects the node 105-4 to the node 105-5. The node 105-3 may thus communicate directly with each of the nodes 105-1, 105-2, and 105-4. The node 105-3 may communicate with the node 105-5 indirectly, through the node 105-4 and the links 120-4 and 120-5. This is just one example. More generally, any of the nodes 105-N may be connected by such side channel link 120 to any of the other nodes 105-N, and any of the nodes 105-N may lack a direct link to any other node (or nodes) 105-N, and communicate with such other nodes 105-N through intermediate nodes and multiple (two or more) links. The side channel links 120 may be implemented, for example, using short-range radio frequency (RF) link such as a Bluetooth® link, WiFi, or other short-, medium-, and longer-range RF technologies. As discussed in some of the related and commonly-owned patent documents listed below, the side channel links 120 may also be implemented using non-RF technologies and transmission media, including optical technologies, such as free-space or guided optics, and sound/acoustic (ultrasound) technologies. Moreover, different types of side channel links 120 may be present within the same array, for example, both RF and non-RF links.

The array 110 includes ad hoc nodes 110-M that may communicate with each other, and synchronize their respective clocks (i.e., aligning time, phase, and frequency). As shown, the array 110 includes five distributed cooperating nodes, 110-1 through 110-5; and side channel links 130-1, 130-2, 130-3, 130-4, and 130-5.

The inter-node distance of each of the arrays 105 and 110 may be much smaller (by a factor of at least 10, at least 100, at least 1000, or even greater) than the inter-array distances between any of the nodes 105 and any of the nodes 110. For example, each of the distances between any two nodes 105 may be less than $\frac{1}{10}$, less than $\frac{1}{100}$, or less than $\frac{1}{1000}$ than any of the distances between any selected node 105 and any selected node 110. In examples, however, the inter-node distance of either or both arrays 105 and 110 are not much smaller (as "much smaller" is explained at the beginning of this paragraph) than the inter-array distances.

Figure 2:
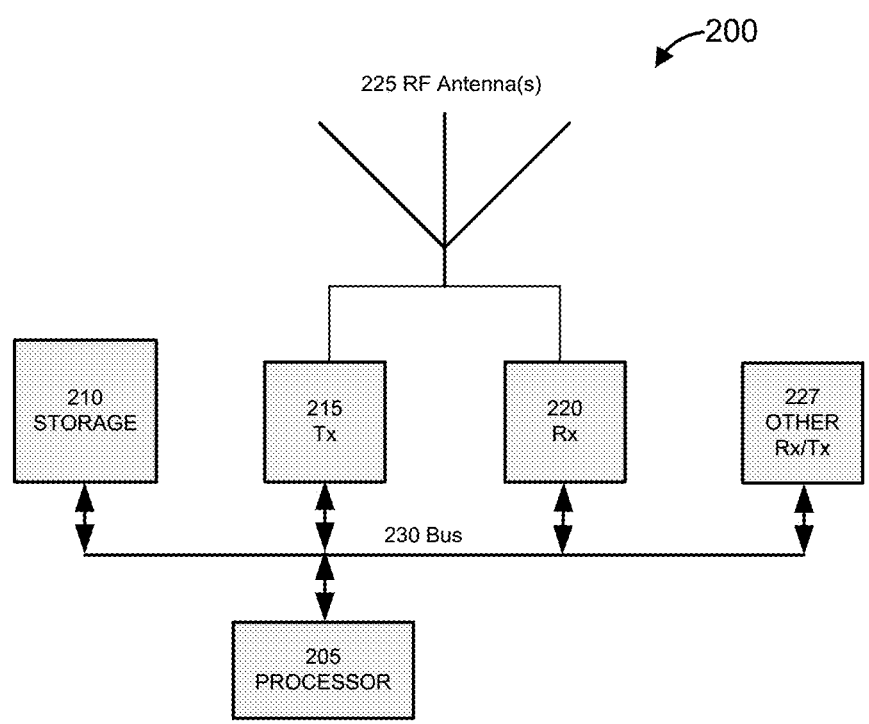
FIG. 2 illustrates selected elements of a node of an array configured in accordance with one or more features described in this document.

FIG. 2 illustrates selected elements of an apparatus 200 configured in accordance with one or more features described in this document. The apparatus 200 may be any of the cooperative nodes of the arrays 105 and 110. The apparatus may include a processor 205; storage device(s) 210 (which may store program code for execution by the processor 205); an RF receiver 220 configured to receive radio frequency signals, such as sounding signals and their reflections/backscatter and information from other nodes of the same array and from nodes of other arrays; an RF transmitter 215 configured to transmit radio frequency signals, such as sounding signals, collaborative communications to nodes of other arrays, and information for other nodes of the same array; one or more RF transmit and receive antennas 225 coupled to the receiver 220 and the transmitter 215; and a non-RF processing module 227, such as an optical or acoustic transceiver and associated signal processing devices. A bus 230 couples the processor 205 to the storage device 210, to the receiver 220, to the transmitter 215, and to the non-RF processing module 227. The bus 230 allows the processor 205 to read from and write to these devices, and otherwise to control operation of these devices.

In embodiments, additional receivers and/or transmitters are present and coupled to the processor 205.

In examples, the arrays 105 and 110 communicate in whole or in part using Time-Reversal techniques. Time Reversal techniques may combine (1) sounding of a channel with (2) applying pre-filtering to a transmission, e.g., time-reversing the channel impulse response (the channel response from one object to another) and convolving it with data to be sent or with some other signal such as a pulse/burst or another waveform (which may be a well-autocorrelated waveform). "Sounding" and its inflectional morphemes refer to transmitting a signal for the purpose of obtaining information about the channels, for example, for forming TR signals. Sounding may also be opportunistic, that is, the sounding signal may be transmitted for another purpose but also used for obtaining the channel state information. The sounding signal may be a sharp pulse approaching an impulse, a Gaussian burst, or another appropriate burst with substantially flat frequency response in the communication band, and having a good autocorrelation function (i.e., approaching that of an impulse function), as is known in communication theory and related fields (e.g., CDMA, autocorrelation radar).

Time-reversal techniques (for communication and other purposes) and sounding are described in several commonly-owned and related patent documents, including the following:

1. U.S. patent application Ser. No. 13/462,514, Publication Number 2012-0328037, entitled ANTI-GEOLOCATION, filed on 2 May 2012;

2. International Patent Publication WO/2012/151316 (PCT/US2012/36180), entitled DISTRIBUTED CO-OPERATING NODES USING TIME REVERSAL, filed 2 May 2012;

3. U.S. patent application Ser. No. 14/114,901, Publication Number 2014-0126567, entitled DISTRIBUTED CO-OPERATING NODES USING TIME REVERSAL, filed on 30 Oct. 2013;

4. U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011;

5. U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011;

6. U.S. Provisional Patent Application Ser. No. 61/809,370, entitled APPARATUS, METHODS, AND ARTICLES OF MANUFACTURE FOR COLLABORATIVE BEAM-FOCUSING OF RADIO FREQUENCY EMISSIONS, filed on 7 Apr. 2013;

7. U.S. Provisional Patent Application Ser. No. 61/829,208, entitled APPARATUS, METHODS, AND ARTICLES OF MANUFACTURE FOR COLLABORATIVE BEAM-FOCUSING OF RADIO FREQUENCY EMISSIONS, filed on 30 May 2013;

8. International Patent Application PCT/US2014/033234, entitled DISTRIBUTED CO-OPERATING NODES USING TIME REVERSAL, filed 7 Apr. 2014;

9. U.S. patent application Ser. No. 14/247,229, Publication Number US 2014-0301494, entitled DISTRIBUTED CO-OPERATING NODES USING TIME REVERSAL, filed on 7 Apr. 2014;

10. U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013;

11. U.S. patent application Ser. No. 14/476,738, Publication Number US 2015-0085853, entitled SYNCHRONIZATION OF DISTRIBUTED NODES, filed on 4 Sep. 2014;

12. U.S. patent application Ser. No. 14/494,580, Publication Number 2015-0173034, entitled SYNCHRONIZATION OF DISTRIBUTED NODES, filed 23 Sep. 2014;

13. U.S. Provisional Patent Application Ser. No. 62/126,437, entitled TIME REVERSAL IN WIRELESS COMMUNICATIONS, filed on 27 Feb. 2015;

14. International Patent Publication WO/2016/137898 (PCT/US2016/018968), entitled TIME REVERSAL IN WIRELESS COMMUNICATIONS (OFDM), filed 22 Feb. 2016;

15. U.S. Provisional Patent Application Ser. No. 62/196,885, entitled TIME REVERSAL IN WIRELESS COMMUNICATIONS, filed on 24 Jul. 2015; and 16. U.S. patent application Ser. No. 15/217,944, entitled WIRELESS SENSING WITH TIME REVERSAL, filed 22 Jul. 2016.

Each of the patent documents described above is hereby incorporated by reference, including specification, claims, figures, tables, and all other matter in the patent document. We may refer to these documents and other commonly-owned patent documents specifically identified throughout the present document collectively as "incorporated applications" and "incorporated patent documents."

Turning now again to FIG. 1, recall that each of the arrays 105/110 has a plurality of nodes, with at least one antenna per node. (Each node can have a single antenna or a sub-array of antennas.) In the following discussion, we will consider the array 105 as the initiating array with N nodes, and the array 110 as the receive array with M nodes; generally these are the two ends of the desired communication link, though cascaded arrangements will be described as well. The array 105 is initiating in the sense that it begins the beamforming process by sending the original sounding signal; the roles of the two arrays may be reversed.

The nodes within each of the arrays can communicate locally (with other nodes of the same array), for example, for data distribution, synchronization, coordination, and other purposes. The nodes of the array 105 may be ad hoc nodes with separate individual clock references; the nodes may be tethered with a common clock reference; or the array 105 may have a combination of both types of nodes, ad hoc and tethered (not ad hoc) nodes. Similarly, the nodes of the array 110 may be ad hoc nodes, tethered nodes, or the array 110 may have a combination of both types of nodes. At each of the arrays 105/110, local time, phase, and frequency synchronization/alignment of nodes is performed using, for example, the processes described in the incorporated patent documents. Thus, in each of the arrays 105/110, a time base common to the respective array is established with a common reference mirror and emission time set for all local array nodes. The reference mirror and emission times may be used to perform channel sounding, beamforming, and retrodirection.

For the array-to-array communications, target array discovery may be a challenge when the transmit power is too limited to provide sufficient link budgets to enable an individual node of the array 105 to communicate across the link to an individual node of the array 110, and/or vice versa. Therefore, no individual radio within the transmit array may be able to communicate with a node within the other array. But the transmit power may be sufficient for a communication link between the arrays to be established using beamforming array gains. This is due to the increased link budget resulting from multiple array nodes. An iterative TR (ITR) algorithm may be used to determine the transmit and receive antenna beamforming weights to increase the link performance. Note that in this document the meaning of "ITR" is descriptive in the context of array-to-array communications, and therefore may be somewhat different from the meaning of "ITR" in some of the incorporated patent documents; the meanings of "ITR" in this document and the incorporated patent documents, however, are analogous, mutatis mutandis, as a person of average skill in the art of RF communications will understand after careful perusal of this document and the incorporated patent documents. The term Reciprocal Convergence Algorithm or process means ITR in the array-to-array context, as will become clear.

An exemplary ITR process between two arrays may start with an initial state where the array-to-array link has not yet been established. In this case, the arrays may close the link between them using a number of methods described herein. This may be referred to as a "cold start" condition.

Array-to-array beamforming uses a mechanism to derive the transmit and receive beamforming weights at each end of the link between the two arrays, e.g., the link between the arrays 105 and 110. With channel reciprocity in a time division duplex (TDD) configuration and when the transmit array and receive array are identical in size, number of nodes, and geometry, the transmit beamforming and receive beamforming weights may be identical at each node; that is, for a given node the transmit weights are the same as receive weights, though the weights will typically vary from node to node. Below we describe various approaches to establish coherent array-to-array beamforming using ad hoc and/or tethered nodes.

If the layout of the array (e.g., the array 105) is unavailable at the beginning of the beamforming process, the array may use a time-coordinated emission to close the link to the other array (e.g., to the array 110). Recall that the nodes within the array 105 may be tethered and/or ad hoc. The ad hoc nodes may first be synchronized/aligned to other ad hoc nodes of the array 105, and to the tethered nodes if such are present in the array 105 in addition to the ad hoc nodes. A common time, $t_0$, may be used as a reference for the array 105 nodes to emit a coordinated sounding. The array 105 nodes may all emit the sounding at the time $t_0$ or time-stagger their soundings based on their relative distance that is derived during the clock-frequency synchronization/alignment step. Relative distance may be to the center of mass of the array (with each node having the same weight, for example), the most central node, or any other metric that derives relative distances along the nodes within a distributed array. If the nodes are tethered and their relative locations are not known, the time of emission may also be varied from sounding to sounding in some time-varying manner, for example, random or following some predetermined order or variations, within a predetermined or dynamically-determined time boundary $\Delta t$. The bounds on $\Delta t$ may be set to the maximum inter-node time-of-flight of the array 105, or somewhat higher (e.g., 50% higher).

Thus, after the nodes of the array 105 are synchronized/aligned, the array may emit a sounding at a coordinated time. The collective signal may exhibit, on average, an incoherent gain of N, statistically varying between decoherent to coherent at the other array 110. This is in part due to unknown channel delays from each node of the array 105 to the nodes of the array 110, causing the sounding signals not to align perfectly at the nodes of the array 110. The fluctuation between coherent and decoherent may be due to the randomized carrier phases of the signals incident on the array 110. Statistically, the coordinated sounding from the array 105 may achieve sufficient link budget increases to be detected by the array 110, so that a beamforming training session may begin. The array 105 may then use a coordinated incoherent search signal to converge towards focused communication to the array 110.

Once the nodes 105 agree on a signal emission time and time window duration, the nodes 105 may emit a signal in a coordinated manner, for example, simultaneously (e.g., if the location of the nodes 110 of the other array are unknown), or with some coarse weighting (if an approximate location of the nodes 110 or the direction from the array 105 to the array 110 is known). Note that the array 105 does not need to have beamforming weights for ideal or near ideal coherent addition at the array 110. Thus, the following exemplary procedures may be followed for the initial coordinated incoherent sounding:

1. A sounding signal may be emitted from the array 105 in a blind manner, i.e., with every node 105 emitting at agreed upon time. The array 110 capture of the sounding signal will then depend on the incoherent gain statistics; thus, multiple soundings may be needed for an incoherent sounding signal from the array 105 to be identified at the array 110.

2. Beamforming weights may be estimated for the sounding signal at the array 105 if a priori information on location and/or direction of the array 110 is known at the array 105. The information on the layout of the array 105 (which may also be needed to estimate the beamforming weights) may be derived, for example, from GPS or inter-node time-of-flight data.

Figure 3:
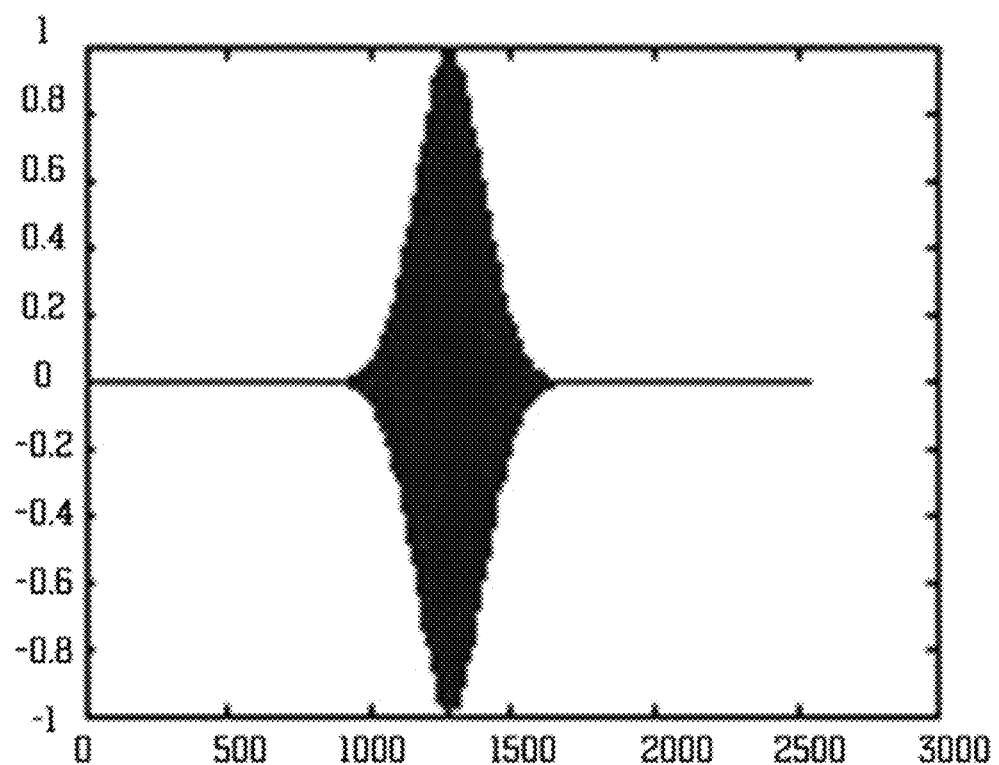
FIG. 3 illustrates selected features of an example of an emitted sounding signal.

FIG. 3 illustrates an example of an emitted sounding signal 300, such as an initial sounding signal emitted by the nodes of the array 105. In the Figure, the sounding signal 300 appears substantially as a Gaussian waveform for illustrative purposes, but can be another waveform, particularly a well-autocorrelated function as is discussed above in the context of explaining time reversal.

While a single node 105 emitting a sounding signal independently may not have the ability to trigger a beamforming weight training initialization because its signal may be buried in noise after path loss and fading, conditions may exist such that a coordinated sounding from the array 105, statistically, has sufficient incoherent gain to overcome link budget deficit and the sounding may be detected by one or more of the nodes of the array 110.

The array 110 nodes are thus triggered by the initial incoherent beamforming sounding signal from the array 105 to begin the TR-based back-and-forth training sequence during which beamforming weights are determined at both arrays. The array 110 nodes are synchronized/aligned, which may be done, for example, in response to the initial sounding from the array 105, or earlier. The nodes of the array 110 set a common Time Reversal capture-retransmission window, and simultaneously transmit the Time-Reversed sounding signal received from the array 105. The Time-Reversed signal transmitted by the array 110 is encapsulated (contained) in this window. This latter signal is the sounding signal of the array 110 transmitted to the array 105 as part of the first back-and-forth beamfocusing iteration of the two arrays.

The sounding signal transmitted by the array 110 as part of the first iteration is received by the nodes of the array 105, Time-Reversed, and re-transmitted back to the array 110 in a common capture-retransmission window of the array 105. This latter sounding signal is the first sounding signal of the second back-and-forth beamfocusing iteration; it will typically be better focused than the initial sounding signal from the array 105 to the array 110.

The latest sounding signal emitted by the array 105 is received by the array 110. Because of the better focusing, there should be some coherent gain, and the received signal may be stronger than the sounding signal received by the array 110 in the first iteration. The array 110 then Time-Reverses it and re-transmits it back to the array 105 in a common window of the array 110. This is the second part of the second iteration.

The back-and-forth sounding may be continued as needed, to focus each of the arrays 105/110 on the other array 110/105. Once sufficient beamforming is achieved, the two arrays may communicate and exchange data across the array-to-array link with the transmit/receive beamforming gains that have been determined as part of the beamforming operation. Sufficiency of the beamforming may be determined, for example, by reference to some performance metric or change in the performance metric (e.g., SNR for one or both sides, and/or change in the SNR from one iteration to a following iteration). The sufficiency of beamforming may also be determined by reference to the changes of the beamforming weights in one or both arrays. For example, a metric aggregating differences between each current weight and the same weight as determined in the immediately previous (or another previous) iteration may be computed, and sufficiency may be declared when this "aggregated differences metric" is less than some predetermined limit. The aggregated differences metric may be based on the mean square computations.

The back-and-forth iterative beam focusing process may be repeated as needed, for example, to maintain link performance in either or both directions, as determined based on some link metric such as a bit/symbol/block error rate, or SNR. The process may also or instead be repeated periodically, at other predetermined or random times, or in response to other factors. When repeated, the process may but need not begin at the "cold start" condition; the process can use the latest beamforming weights as the starting point.

To recapitulate, the arrays 105 and 110 use time reversal to obtain the (relatively) coherent signal based on the (relatively) incoherent signal through multiple back-and-forth iterations, converging towards the optimal or near-optimal array-to-array beamforming weights. The array 110 nodes may initially be triggered by the incoherent beamforming training request to begin the Time-Reversal-based back-and-forth array weight training sequence. The array 110 nodes set a common Time Reversal capture window, and retransmit simultaneously the signal encapsulated in this window for nodes 110-1 through 110-M. The array 105 nodes capture the Time Reversed coordinated transmission from the array 110, and time reverse and retrodirect the captured signal back to the array 110. The array 110 repeats the Time Reversal mirroring back to the array 105. These steps may be repeated in a back-and-forth manner, which we may call the "Reciprocal Convergence Algorithm" in this document. Through a series of back-and-forth Time Reversal retrodirections, the array emissions may converge to the optimal or near-optimal beam-patterns for communication with beamforming weights discovered automatically, without calculation, without explicit channel estimation, and without a priori node layout knowledge requirements.

Figure 4:
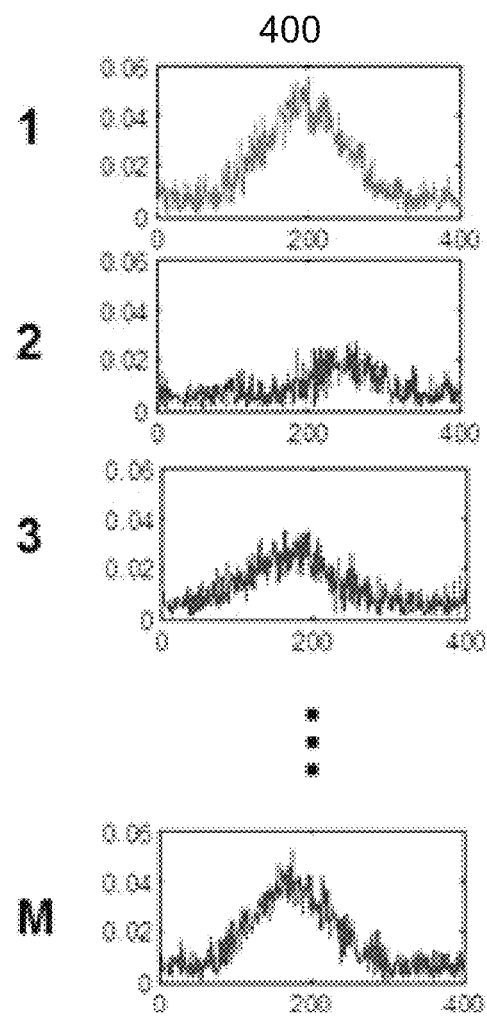
FIG. 4 and FIG. 5 illustrate selected aspects of simulations of signals on receivers of ad hoc node arrays.
Figure 5:
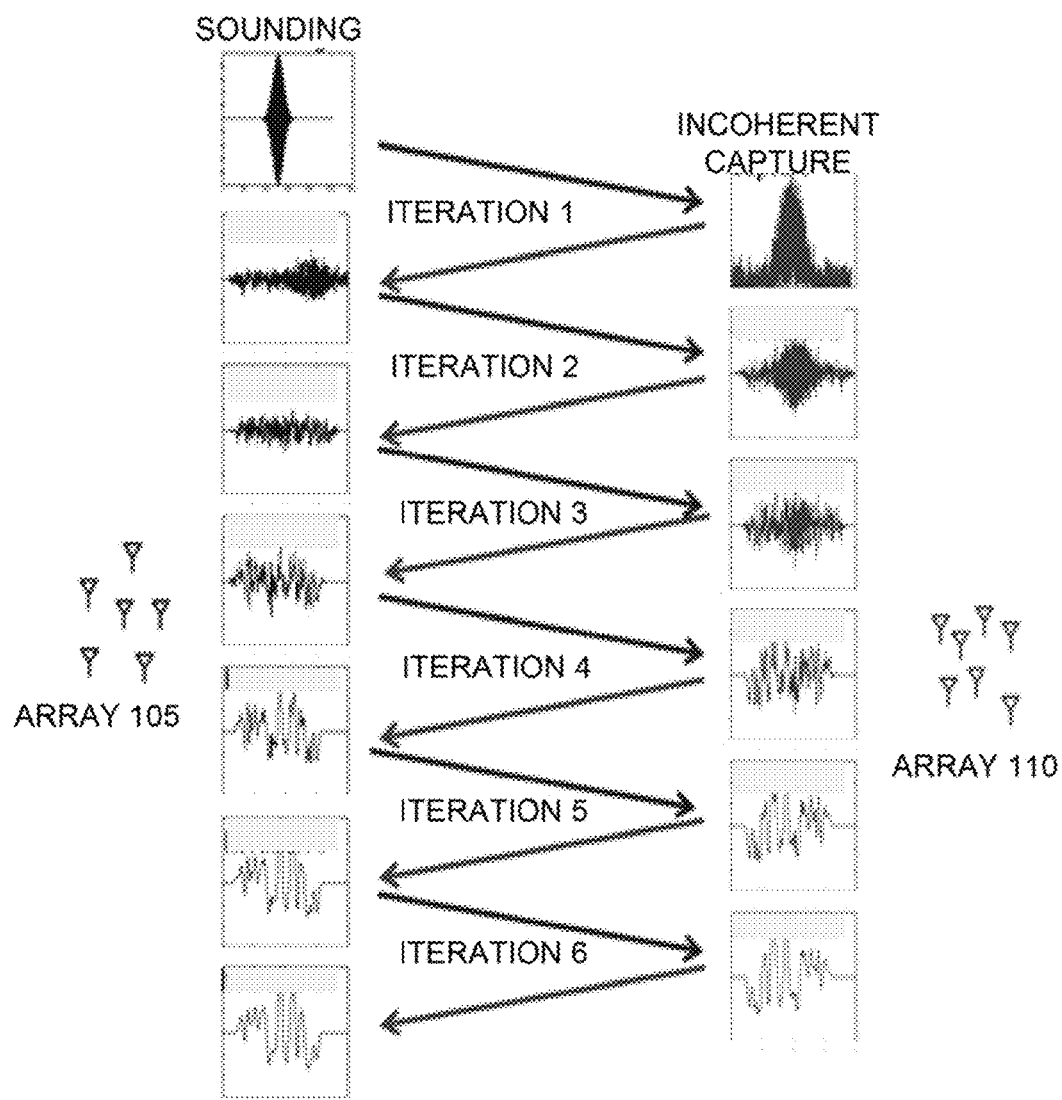
Figure 6A:
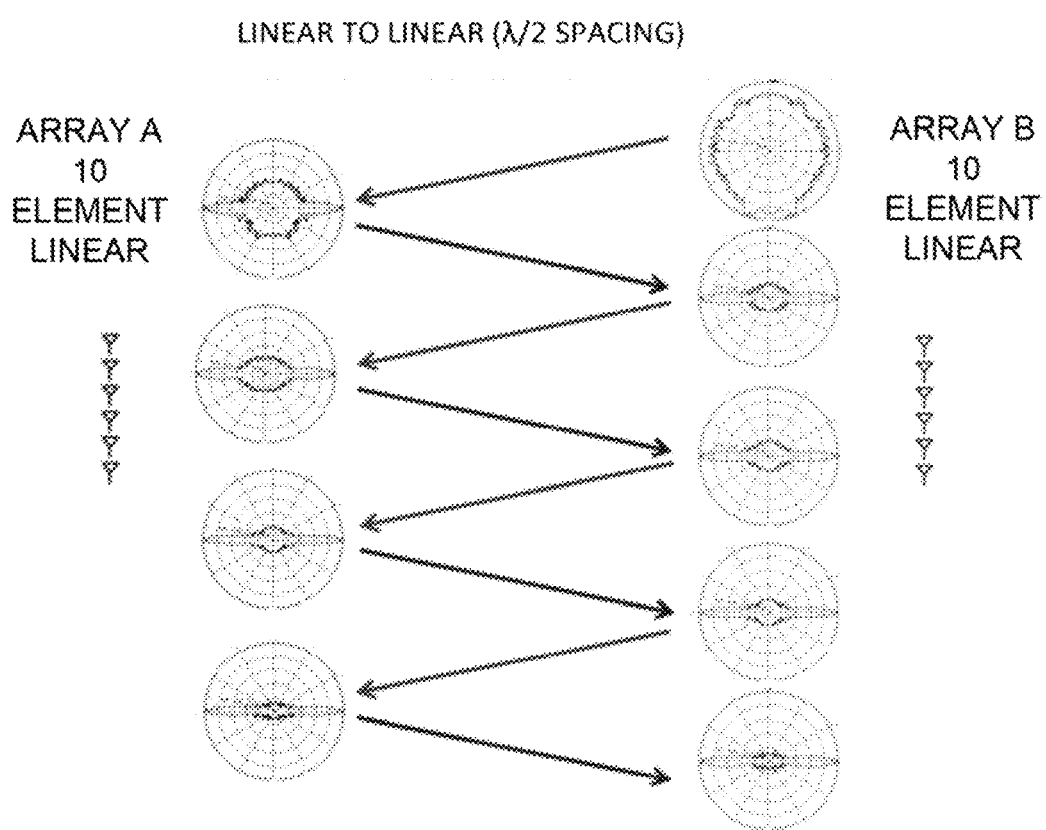
FIG. 6A and FIG. 6B illustrate selected aspects of simulations of convergence of exemplary Iterative Time-Reversal or Reciprocal Convergence Algorithm processes.
Figure 6B:
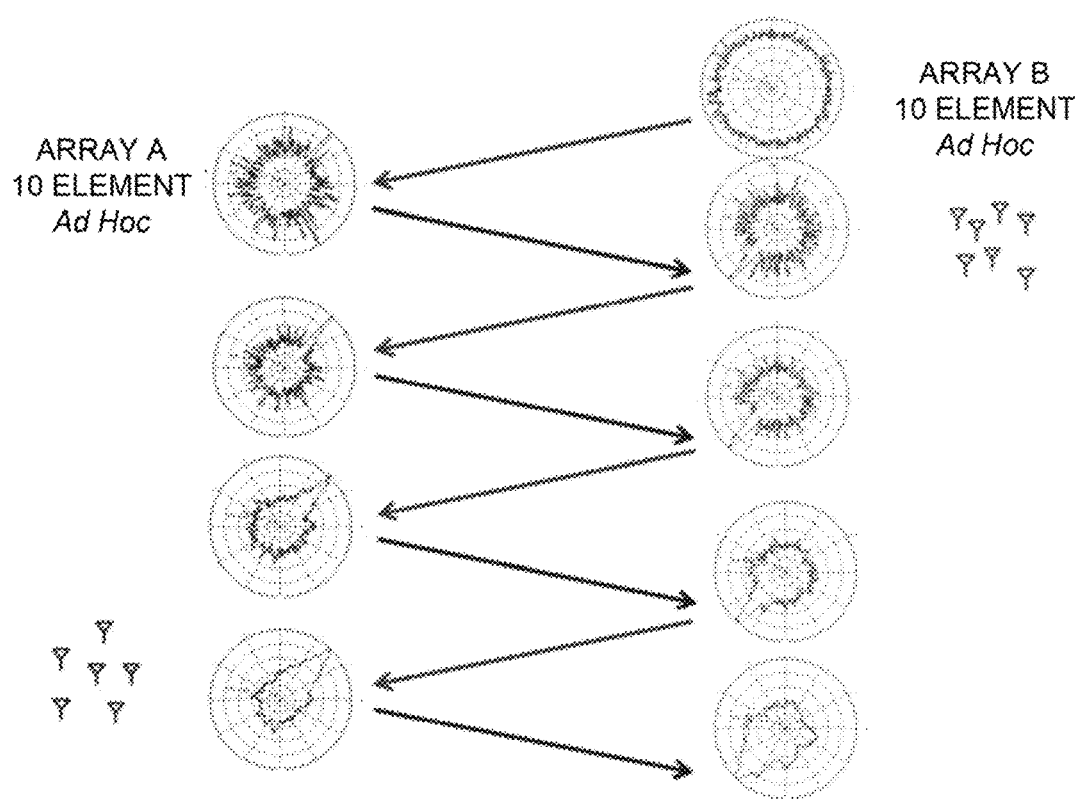

FIG. 4 and FIG. 5 illustrate selected aspects of simulations of signals observed on one of receivers on each end of the link for ad hoc node array layouts, and demonstrate the Reciprocal Convergence processes for array weight discovery, transforming the beamforming from uninformed to informed, for each individual node when both arrays are located within LoS. The arrows in FIG. 5 indicate the direction in which the sounding signals are emitted. Aspects of the convergence of exemplary ITR or Reciprocal Convergence processes are illustrated in FIG. 6A and FIG. 6B. FIG. 6A illustrates a simulated convergence of linear 10-node Array A and 10-node Array B to a focused beam (one array to the other array) through a series of Time Reversal iterations, showing how the beam pattern converges from an omnidirectional search to a more focused beamformed pattern. FIG. 6B illustrates a simulated convergence of a 10-node ad hoc Array A and 10-node ad hoc array B with non-linear geometries. The broader beam shape at convergence in FIG. 6B may be due to the ad hoc array-to-array beamforming energy maximization for coherent transmit to all the array members.

Figure 7:
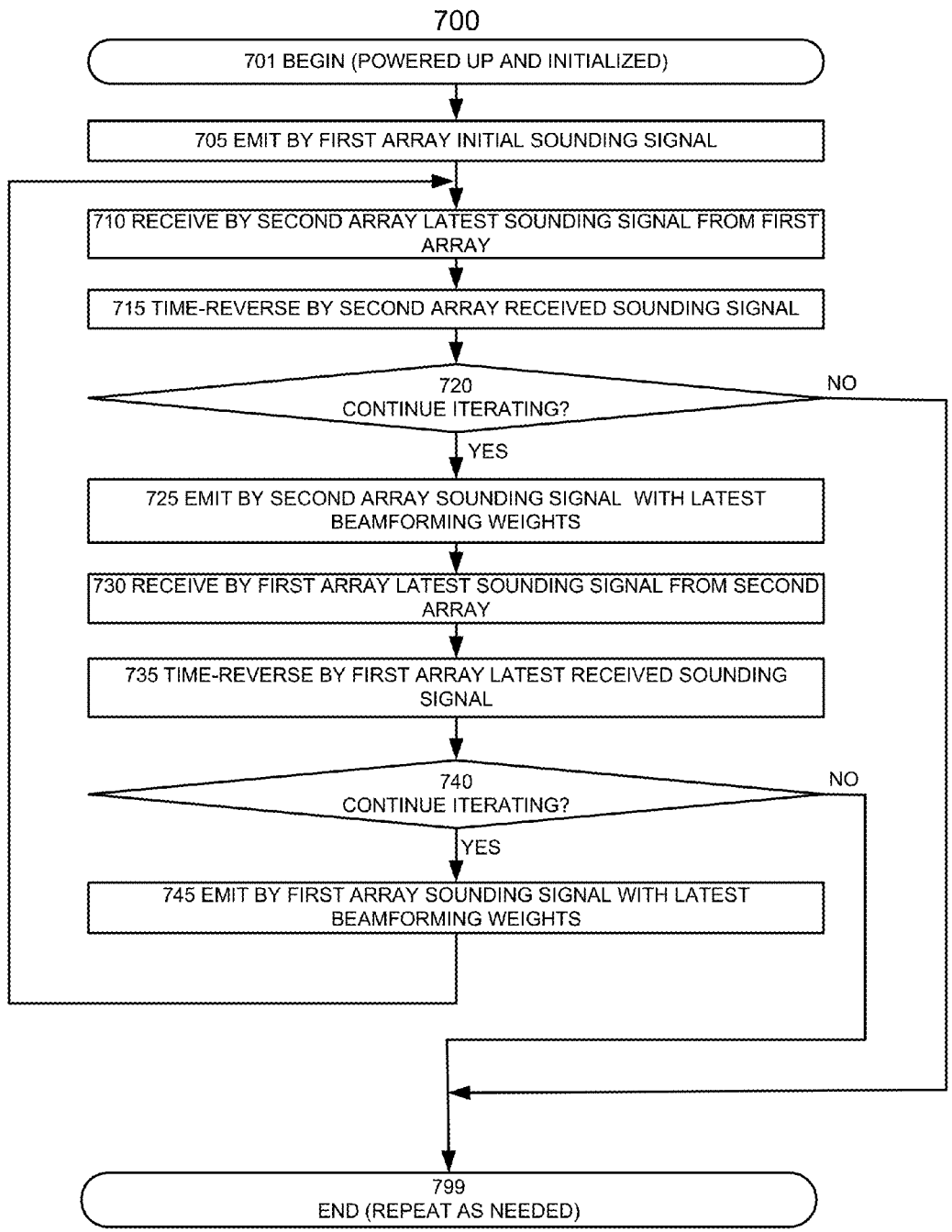
FIG. 7 illustrates selected steps and decision blocks of an exemplary Reciprocal Convergence Algorithm.

FIG. 7 illustrates selected steps of a Reciprocal Convergence Algorithm process 700 performed between two ad hoc arrays. It should be noted, however, that tethered and other arrays may be used in an analogous manner. To facilitate discussion, we will refer to the arrays 105/110 discussed above.

The process 700 begins at a flow point 701, where the devices performing the process 700 (e.g., the nodes of the arrays 105/110) are powered and initialized. Initialization of an ad hoc array may include frequency, phase, and time synchronization/alignment of the individual nodes.

In step 705, an initial sounding signal is transmitted by the nodes of one of the arrays, for example, the nodes of the array 105. The initial sounding signal may be, for example, an omnidirectional or substantially omnidirectional signal with a good autocorrelation function, such as a pulse, burst, Gaussian function, etc. An omnidirectional emission may be similar to an emission from a dipole radiator, and need not have beamforming weights. Note, however, (that the use of beamforming weights even for the initial signal is not excluded, particularly when some a priori information is available. The nodes of the array 105 may transmit the initial sounding signal simultaneously, at $t_0$. Here, the sounding signal is in effect a signal combining the transmissions of the multiple nodes of the array 105.

In step 710, the sounding signal emitted most recently by the first array is received by the nodes of the other array, for example, the array 110. The reception window is finite; it may be made sufficiently long to receive all significant reflections (multipath components) of the most recent sounding signal from the array 105.

The signals received in the step 710 are time-reversed in step 715 and current beamforming weights at the array 110 are thus computed.

In decision block 720, a test is performed and a decision is made whether the array(s) 110 and/or 105 need to continue the focusing process or sufficient focusing has been achieved. The decision may be made, for example, by reference to some performance metric or change in the performance metric, as has already been mentioned. The test may consider metrics or changes on both sides, i.e., at the array 110 and/or at the array 105. In a specific variant, the relative order of the step 715 and the decision block 720 is reversed.

If the test indicates that the process should continue, the latest beamforming weights are used to emit a sounding signal by the array 110, in step 725, and the process flow continues to step 730. Otherwise, the process flow proceeds to a flow point 799, to be repeated as needed or otherwise (possibly repeated continually).

In the step 730, the sounding signal emitted in the most recent step 725 is received by the nodes of the array 105. The reception window here is also finite; it may be made sufficiently long to receive all significant reflections (multipath components) of the most recent sounding signal from the array 110.

The signals received in the step 730 are time-reversed in step 735 and current beamforming weights at the array 105 are thus computed.

In decision block 740, a test is performed and a decision is made whether the array(s) 105 and/or 110 need to continue the focusing process or sufficient focusing has been achieved. The decision may be made, for example, by reference to some performance metric or change in the performance metric, as has already been mentioned. The test may consider metrics or changes on both sides, i.e., at the array 105 and/or at the array 110. The test in the decision block 740 may be the same or analogous to the test in the decision block 720, mutatis mutandis. In a specific variant, the relative order of the step 735 and the decision block 740 is reversed.

If the test indicates that the process should continue, a sounding signal with the latest beamforming weights is emitted by the array 105, in step 745, and the process flow returns to the step 710. Otherwise, the process flow proceeds to the flow point 799, to be repeated as needed (possibly repeated continually).

Thus, the steps 710-745 may be repeated sequentially, i.e., each time each of the reflected sounding signals is time-reversed and re-emitted. After several iterations, as determined in the decision blocks 720/740, each array 105/110 may be focused on the other array, and the process may then terminate at the flow point 799. The two arrays 105/110 may then send each other (in either direction or in both directions) data-carrying signals with beamforming transmit/receive gains. It should be noted that the sounding signals may also carry or be accompanied by some data; in particular, one of the arrays may signal the other array that the condition of its decision block (720 or 740, as the case may be) has been met.

Beamforming weights for the array-to-array communications may converge from an incoherent initialization to focused beamforming through a series of iterations. Beamforming weights bootstrap incoherent coordinated sounding towards array-to-array beamforming weights in a relatively simple manner. The Tx and Rx beamforming weights are the TR pre-filters derived at each end of the link as the portion of the iteration in a given direction is completed.

Figure 8:
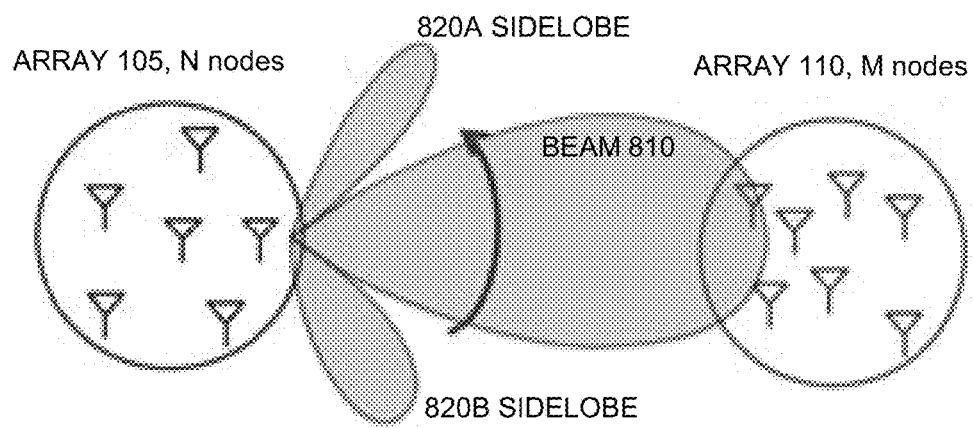
FIG. 8 illustrates selected aspects of sweeping by an array of a main beam with sidelobes.

In the case where any individual node within a first array (e.g., the array 105) is unable to close a link to any of the nodes in the other array (e.g., the array 110) located at the other end of the communication link, all of the nodes or a sub-set of multiple nodes of the first array may be used to initiate a beamforming process. If information on the relative antenna layout of the beamforming array is available (e.g., via GPS, time-of-flight-based computation, or another method), the arrays can use an initial guess on the proper transmit and receive beamforming weights for a location of the other array or in the general direction of the other array. The array layout may enable the first array to calculate the weights to beamform to the desired location or in the desired direction. The first array (e.g., the array 105) may not have ideal beamforming array gain to the desired location, but can still use directionality of the coherent energy to reach the other array (e.g., the array 110). The first array may use a relatively wider beamforming shape to span more area in a search mode and can converge towards a sharper beam for focused scanning. Multiple angles and directions may be swept until a beamforming initiation has been acknowledged by the other array. Sidelobes may also be used to reach the other array if the main beam is not directed to the other array. The coherent energy gained from the coordinated emission from the first array incident on the other array may initiate a beamforming training process if there is sufficient signal to trigger a beamforming request received by any single node, a subset of nodes, or all of the nodes of the other array. In this way, knowledge of the layout of the nodes of the first array may be used to improve the initiating sounding signal in the first iteration, and to sweep the area until the other array responds. FIG. 8 illustrates selected aspects of sweeping a main beam 810 and sidelobes 820A and 820B, in the counterclockwise direction as is indicated by the pointed arrow.

Figure 9A:
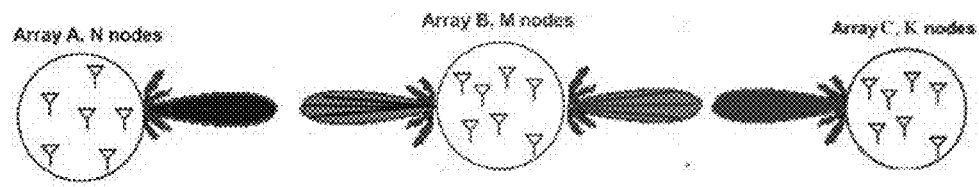
FIG. 9A and FIG. 9B illustrate selected aspects of transmissions from one end-array to another end-array through intermediate array(s) in a cascade manner.
Figure 9B:
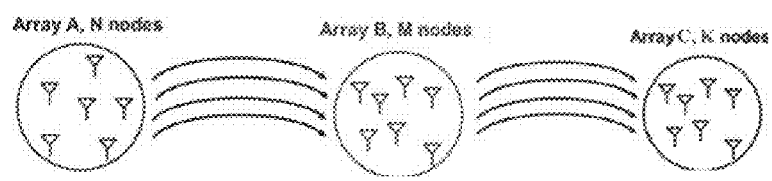

The iterative TR (ITR, Reciprocal Convergence) process that beamforms the signal at two arrays may be repeated for transmissions through intermediate arrays, in a cascaded manner. FIGS. 9A and 9B illustrate selected aspects of such technique. Here, Array B calculates the beamforming weights to communicate with Array A and also calculates the beamforming weights to communicate with Array C, as shown in FIG. 9A. Once the weights are known, Array A may communicate with Array C through Array B, as is shown in FIG. 9B. Array B may, for example, communicate with Array A and Array C in a TDD and/or FDD fashion; or simultaneously at the same frequency if the nodes of Array B are divided so that one set communicates with Array A and the other communicates with Array C.

In the presence of scatterers in the environment affecting signals between two arrays, the beamforming weights may be adjusted in such a way that the signal power transmitted by the nodes of one array (e.g., array 105) arrives coherently at the other array (e.g., array 110), because of the properties of Time Reversal algorithms in NLoS channels. The iterative process may follow the steps described above (e.g., the process 700) to determine the beamforming weights at each of the arrays. To summarize selected aspects:

1. The array 105 nodes agree on a signal emission time and time window transmission and capture time duration.

2. The array 105 nodes initially send the sounding signal to the array 110 in an omnidirectional way, or using some a priori available information (such as the general direction of the array 110 and the relative layout of the nodes of the array 105); or after adjusting the beamforming weights in subsequent iterations.

3. The array 110 nodes agree on a signal capture and emission times, a time window for transmission, and a capture time duration, time-reverse the received signals, and send them back to the array 105.

4. The array 105 nodes agree on a signal emission time and time window transmission and capture time duration, receive the signals from the array 110, time-reverse the signals, and send the signals back to the array 110.

The iterative process may continue until, for example, at least two successive iterations indicate convergence towards the directions between the array 105 and the array 110. Here and elsewhere in this document, convergence may be indicated, for example, by mean square of differences between corresponding beamforming or TR pre-filter coefficients in successive iterations falling below a predetermined limit.

Scatterer nulling may be added to the steps of the processes described above. An iterative process may then proceed as follows:

1. The array 105 nodes send sounding signals either collectively or separately to identify the scatterers (static or semi-static objects) by checking the received echoes. Scatterer nulling is described, for example, in U.S. Provisional Patent Application Ser. No. 62/196,885, entitled TIME REVERSAL IN WIRELESS COMMUNICATIONS, filed on 24 Jul. 2015; and in U.S. patent application Ser. No. 15/217,944, entitled WIRELESS SENSING WITH TIME REVERSAL, filed 22 Jul. 2016.

2. The array 105 sets its initial transmit and receive weights to the TR pre-filter derived from the scatterer echoes in order to null the scatterers.

3. The array 105 nodes send a sounding signal in an omni-directional way to the array 110 after adjusting the beamforming weights to account for scatterer nulling (so the signal is not strictly omni-directional).

4. The array 110 nodes agree on a signal emission time, time window transmission, and capture time duration; time reverse the received signal and send it back to the array 105.

5. The array 105 nodes agree on a signal emission time, time window transmission, and capture time duration; receive the sounding signal from the array 110, time reverse it, and send the time-reversed signal back to the array 110.

The iterative process may continue until, for example, at least two successive iterations indicate convergence towards the directions between the array 105 and the array 110.

Figure 10:
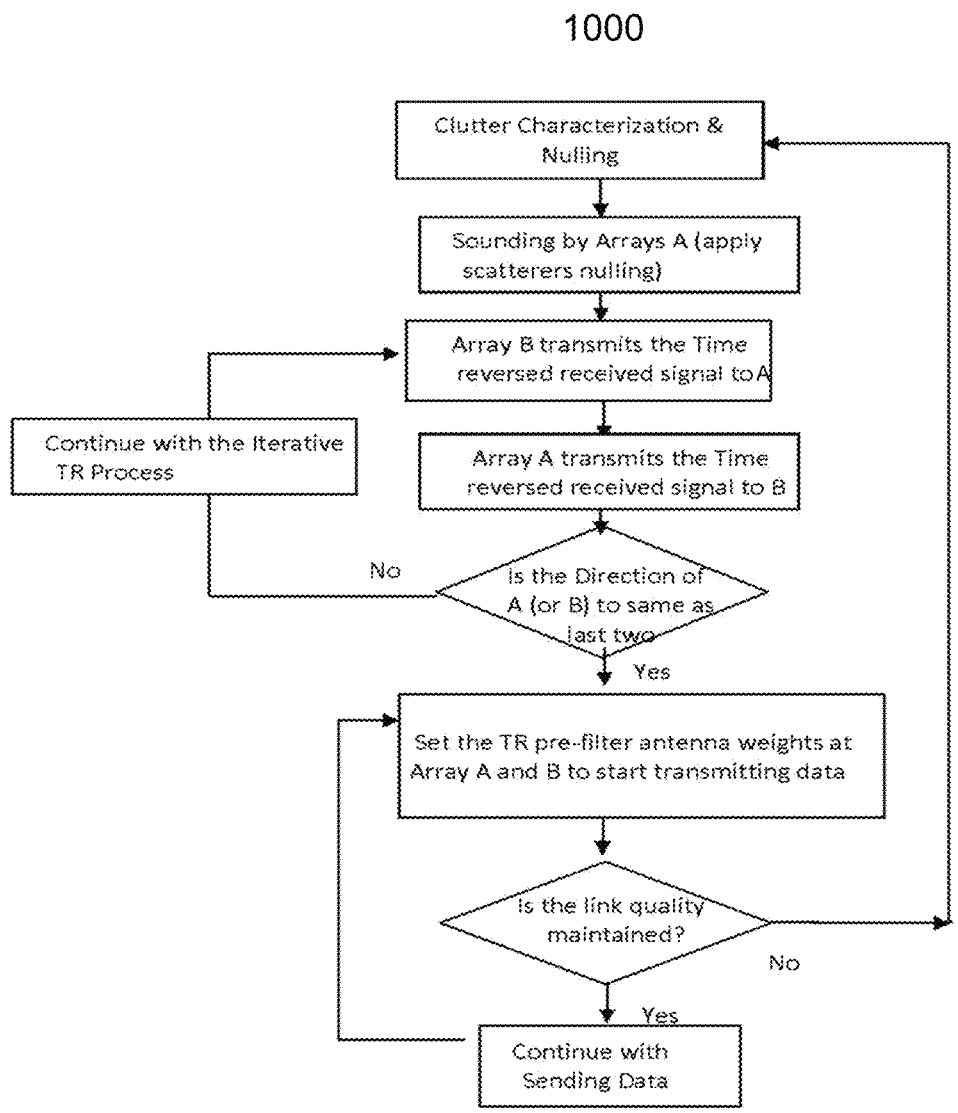
FIG. 10 illustrates selected steps and decision blocks of an exemplary Reciprocal Convergence Algorithm process with scatterer nulling performed between two ad hoc arrays.
Figure 11:
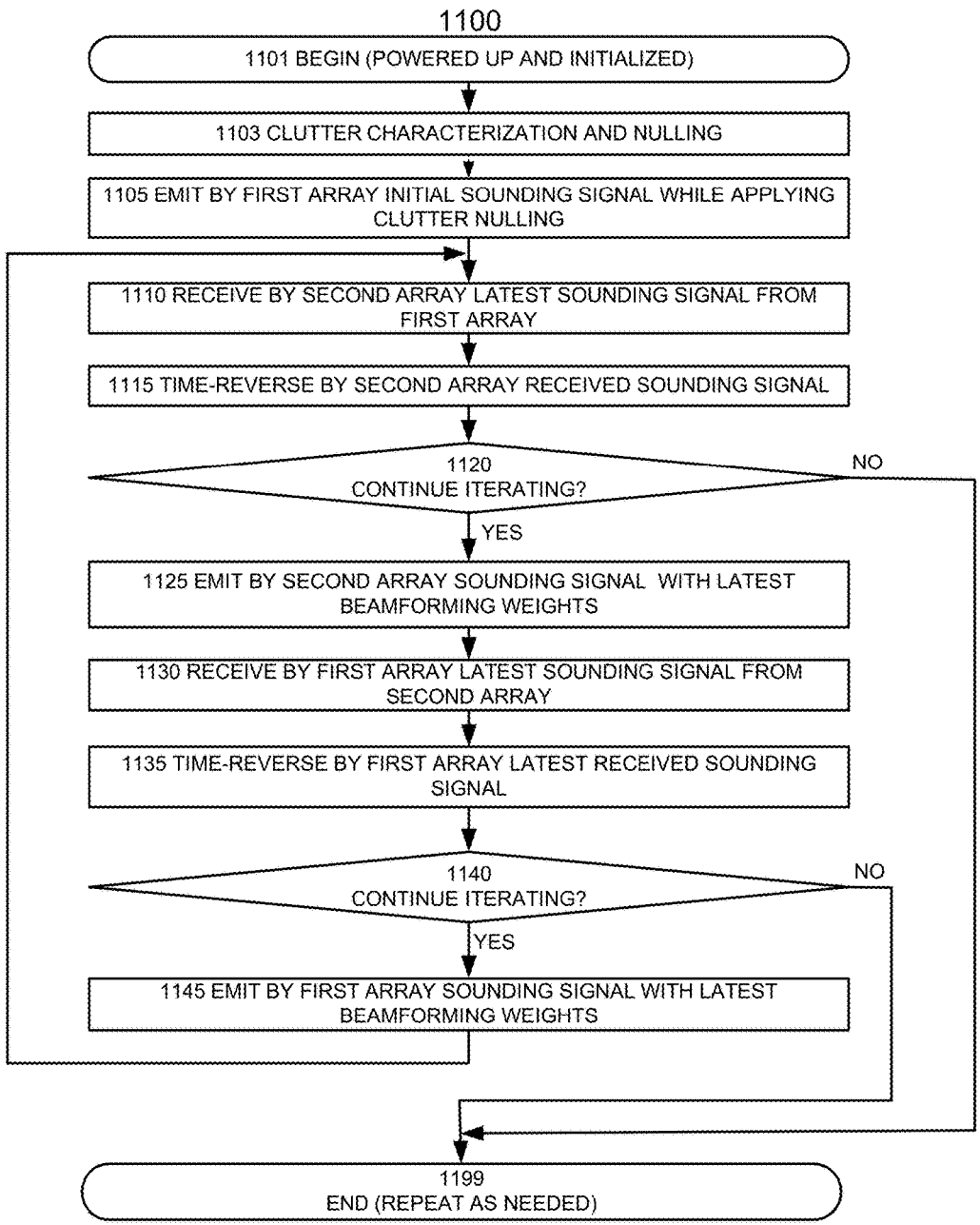
FIG. 11 illustrates selected steps of another example of a Reciprocal Convergence Algorithm process with scatterer nulling performed between two ad hoc arrays.

FIG. 10 illustrates selected steps of an example of a Reciprocal Convergence Algorithm process 1000 with scatterer nulling performed between two ad hoc arrays. FIG. 11 illustrates selected steps of another example of a Reciprocal Convergence Algorithm process 1100 with scatterer nulling performed between two ad hoc arrays; the steps/blocks of the process 1100 may be analogous to the similarly-numbered steps/blocks of the process 700 described above, with an addition of a new step 1103 (clutter characterization and nulling) and "11" substituted for "7" in numbering of the individual steps/blocks. It should be noted that tethered and other arrays may be used in an analogous manner.

In embodiments, one of the arrays (e.g., the array 105) can be responsible for performing the entire alignment. This array not only focuses its sounding signal at each receive node of the other array (e.g. the array 110), but adjusts the phase and any time delays of the signals so that the receivers do not have to perform any alignment process.

We turn now to the TR beam nulling algorithm when trying to null clutter or undesired objects. As has been indicated in this document and the related patent documents, TR algorithms may suppress the eigenmodes coherent energy associated with the clutter objects whose nulling is desired. Let us assume that the nodes of an array identify two objects, i and j, in the array's field of view. Furthermore, let us assume that the total number of antennas of all nodes is M. (This similarly applies to a single node with M antennas rather than M distributed nodes.) The pre-TR-filter weights assigned to each of the M antennas encompass the beam-focusing TR pre-filter vector targeting objects i and j, while nulling object i signal in the direction of object j and vice versa, or nulling object j altogether. Such antenna weights can be derived when the correlation between the $CIR_i$ and $CIR_j$, which are the CIRs (channel impulse or other responses) between Tx/Rx nodes and objects i and j, respectively, is low. Therefore, these two objects are uncorrelated (or orthogonal to each other) or slightly correlated, and hence they can be distinguished from each other using TR and SVD (Singular Value Decomposition) methods, such as Zero-Forcing (ZF), Modified Zero-Forcing (MZF), and Dirty Paper Coding (DPC).

If we denote by $H(\omega)$ the CIR matrix where each row is the CIR between the nodes' M antennas and each of the uncorrelated objects, then the matrix $H^H(\omega)H(\omega)$ should be invertible. The TR pre-filter $TRF(\omega)$ that encompasses the beam-focusing and nulling weights at each of the Tx/Rx antennas is defined such that $TRF(\omega)$ is the product of a linear transformation matrix A and a diagonal power matrix P restricted by the total maximum transmit power, i.e., $TRF(\omega)=A\,P$. Zero-Forcing is when A is defined as $A=H^H(H^HH)^{-1}$; Modified Zero-Forcing is when A is defined as $A=H^H(H^HH+(N_0/P_{avg})I)^{-1}$; and DPC is when A is defined as $A=H^H R^{-1}$ and R is an upper triangular matrix.

Hence the signal focused on objects i and j can be written as $Y=G(\omega)\,X+n$, where $G(\omega)=H(\omega)\,TRF(\omega)$, n is the noise, and X is the sounding signal vector. Then, the nulling condition is written as $y_i \approx g_{ii} x_i + n_i$ and $y_j \approx g_{jj} x_j + n_j$, where the cross-objects interference terms corresponding to $g_{ij}$ are negligible due to the application of one of the three beam nulling algorithms mentioned above.

In some embodiments, the array nodes may be located at multiple wavelengths apart causing high side lobes in the converged radiation pattern after performing ITR. In this case, additional complex weights may be applied to the Tx and Rx antennas (in combination with the above-described nulling mechanism) to reduce the side lobe and increase the energy transmitted toward the Rx array. In this case, the array-to-array algorithm may be combined with additional complex weights at the Tx and Rx using various array synthesis algorithms such as steering vectors, windowing functions, and genetic algorithms. Furthermore, using directional antennas at the Tx and Rx sides can reduce these sidelobes when the Tx and Rx broad orientation is known.

The methods described in this document may also be applied to multi-user TR communication when the Access Point (AP) is communicating with multiple users simultaneously. In this case, the TR pre-filters assigned the each of the AP antenna may be selected such that each users' signal is beam-focused to that specific user while nulling it in the direction of other users to reduce the crosstalk between users. Such transmit beamforming and nulling, also referred to as space division multiple access, enable signal separation by directing one or multiple beams simultaneously towards users at different spatial locations without creating crosstalk between the signals to different users. These algorithms can be performed in the time and frequency domain signal processing.

The features described throughout this document may be present individually, or in any combination or permutation, except where the presence or absence of specific elements/limitations is inherently required, explicitly indicated, or otherwise made clear from the context.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for array-to-array beamforming with time reversal techniques, including using ad hoc and tethered arrays. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention (s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of radio frequency (RF) communication between arrays of nodes, the method comprising steps of:
aligning/synchronizing a plurality of ad hoc nodes of a first array in time and frequency;
aligning/synchronizing a plurality of ad hoc nodes of a second array in time and frequency;
transmitting a first initial sounding signal from the plurality of ad hoc nodes of the first array to the plurality of ad hoc nodes of the second array; and
successively sending sounding signals from the plurality of ad hoc nodes of the first array to the plurality of ad hoc nodes of the second array and from the plurality of ad hoc nodes of the second array to the plurality of ad hoc nodes of the first array, wherein each sounding signal sent by the plurality of ad hoc nodes of the second array is beamformed through time reversal of an immediately preceding sounding signal received by the plurality of ad hoc nodes of the second array from the plurality of ad hoc nodes of the first array, and each sounding signal except the first initial sounding signal sent by the plurality of ad hoc nodes of the first array is beamformed through time reversal of an immediately preceding sounding signal received by the plurality of ad hoc nodes of the first array from the plurality of ad hoc nodes of the second array.

2. The method of claim 1, further comprising:
determining whether sufficient focusing between the first array and the second array has been achieved, thereby obtaining a determination;
sending RF data communications from the plurality of ad hoc nodes of the first array to the plurality of ad hoc nodes of the second array and/or from the plurality of ad hoc nodes of the second array to the plurality of ad hoc nodes of the first array in response to the determination indicating sufficient focusing;
terminating the step of successively sending in response to the determination indicating that sufficient focusing has been achieved;
aligning/synchronizing the plurality of ad hoc nodes of the first array in phase; and
aligning/synchronizing the plurality of ad hoc nodes of the second array in phase.

3. The method of claim 2, wherein the step of determining is based on convergence of beamforming weights in at least one of the first array and the second array.

4. The method of claim 3, further comprising scatterer nulling by the first array before the step of transmitting the first initial sounding signal.

5. The method of claim 2, wherein the step of transmitting the first initial sounding signal comprises beam sweeping.

6. The method of claim 2, wherein the step of transmitting the first initial sounding signal comprises beam and sidelobe sweeping.

7. The method of claim 2, wherein the step of transmitting the first initial sounding signal comprises forming a beam in a general direction from the first array to the second array.

8. The method of claim 2, wherein the step of transmitting the first initial sounding signal comprises using knowledge of relative layout of the first array and knowledge of a general direction from the first array to the second array.

9. The method of claim 2, wherein the step of transmitting the first initial sounding signal is not performed using a cold start condition.

10. The method of claim 2, further comprising:
aligning/synchronizing a plurality of ad hoc nodes of a third array in time, phase, and frequency;
transmitting a second initial sounding signal from the plurality of ad hoc nodes of the third array to the plurality of ad hoc nodes of the second array; and
successively sending sounding signals from the plurality of ad hoc nodes of the third array to the plurality of ad hoc nodes of the second array and from the plurality of ad hoc nodes of the second array to the plurality of ad hoc nodes of the third array, wherein each sounding signal sent by the plurality of ad hoc nodes of the second array to the plurality of ad hoc nodes of the third array is beamformed through time reversal of an immediately preceding sounding signal received by the plurality of ad hoc nodes of the second array from the plurality of ad hoc nodes of the third array, and each sounding signal except the second initial sounding signal sent by the plurality of ad hoc nodes of the third array to the plurality of ad hoc nodes of the second array is beamformed through time reversal of an immediately preceding sounding signal received by the plurality of ad hoc nodes of the third array from the plurality of ad hoc nodes of the second array.

11. Apparatus comprising:
a first array comprising a plurality of first ad hoc radio frequency (RF) nodes; and
a second array comprising a plurality of second ad hoc RF nodes;
wherein the first array and the second array are configured to:
align/synchronize the plurality of first ad hoc RF nodes in time and frequency;
align/synchronize the plurality of second ad hoc RF nodes in time and frequency;
transmit an initial sounding signal from the plurality of first ad hoc RF nodes of the first array to the plurality of second ad hoc radio frequency (RF) nodes of the second to array; and
successively send sounding signals from the plurality of first ad hoc RF nodes of the first array to the plurality of second ad hoc RF nodes of the second array and from the plurality of second ad hoc RF nodes of the second array to the plurality of first ad hoc RF nodes of the first array, wherein each sounding signal sent by the second array is beamformed through time reversal of an immediately preceding sounding signal received by the second array from the first array, and each sounding signal except the initial sounding signal sent by the first array is beamformed through time reversal of an immediately preceding sounding signal received by the first array from the second array.

12. The apparatus of claim 11, wherein the first array and the second array are further configured to:
align/synchronize the plurality of first ad hoc RF nodes in phase;
align/synchronize the plurality of second ad hoc RF nodes in phase;
determine whether sufficient focusing between the first array and the second array has been achieved, thereby obtaining a determination;
send radio frequency (RF) data communications from the plurality of first ad hoc RF nodes of the first array to the plurality of second ad hoc RF nodes of the second array and/or from the plurality of second ad hoc RF nodes of the second array to the plurality of first ad hoc RF nodes of the first array in response to the determination indicating sufficient focusing; and
stop successively sending in response to the determination indicating that sufficient focusing has been achieved.

13. The apparatus of claim 12, wherein the determination is based on convergence of beamforming weights in at least one of the first array and the second array.

14. The apparatus of claim 13, wherein at least one of the first array and the second array is further configured to null scatterers.

15. The apparatus of claim 12, wherein the first array is further configured so that the initial sounding signal from the first array to the second array is transmitted using beam sweeping.

16. The apparatus of claim 12, wherein the first array is further configured so that the initial sounding signal from the first array to the second array is transmitted using beam and sidelobe sweeping.

17. The apparatus of claim 12, wherein the first array is further configured so that the initial sounding signal from the first array to the second array is transmitted as a beam in a general direction from the first array to the second array.

18. The apparatus of claim 12, wherein the first array is further configured so that the initial sounding signal from the first array to the second array is formed using knowledge of relative layout of the first array and knowledge of a general direction from the first array to the second array.

19. The apparatus of claim 12, wherein the first array is further configured so that the initial sounding signal from the first array to the second array is performed not using a cold start condition.

20. An article of manufacture comprising at least one non-volatile machine-readable storage medium with program code stored in the at least one non-volatile machine-readable storage medium, the program code, when executed by processors of nodes of a first array and of nodes of a second array, each node of the first array and each node of the second array comprising an antenna, a radio frequency transceiver coupled to the antenna, a local oscillator, and a processor coupled to the radio frequency transceiver to control operation of the transceiver, configures the nodes of the first array and the nodes of the second array to:
- align/synchronize the nodes of the first array in time and frequency;
- align/synchronize the nodes of the second array in time and frequency;
- transmit an initial sounding signal from the first array to the second array; and
- successively send sounding signals from the first array to the second array and from the second array to the first array, wherein each sounding signal sent by the second array is beamformed through time reversal of an immediately preceding sounding signal received by the second array from the first array, and each sounding signal except the initial sounding signal sent by the first array is beamformed through time reversal of an immediately preceding sounding signal received by the first array from the second array.

21. The article of manufacture of claim 20, wherein the first array is an ad hoc array, the nodes of the first array being free to move in absolute terms and with respect to each other.

22. A method of radio frequency (RF) communication between arrays of nodes, the method comprising steps of:
- aligning/synchronizing a plurality of ad hoc nodes of a first array in time and frequency;
- aligning/synchronizing a plurality of ad hoc nodes of a second array in time and frequency;
- step for Reciprocal Convergence process between the first array and the second array to enable beamformed transmissions from the first array to the second array and from the second array to the first array; and
- sending RF data communications from the first array to the second array and/or from the second array to the first array, the step of sending being performed after the step for Reciprocal Convergence process.

23. A method of radio frequency (RF) communication, the method comprising steps of:
- aligning/synchronizing a plurality of ad hoc nodes of a first array in time and frequency;
- transmitting an initial sounding signal from the first array to a second array of nodes;
- successively sending sounding signals from the first array to the second array, wherein each sounding signal except the initial sounding signal is beamformed through time reversal of an immediately preceding sounding signal received by the first array from the second array;
- determining whether sufficient focusing between the first array and the second array has been achieved, thereby obtaining a determination;
- terminating the step of successively sending in response to the determination indicating that sufficient focusing has been achieved; and
- sending RF data communications from the first array to the second array in response to the determination indicating sufficient focusing.

* * * * *